United States Patent
Raimar et al.

(10) Patent No.: US 10,447,153 B2
(45) Date of Patent: Oct. 15, 2019

(54) VBOOST SIGNAL GENERATION

(71) Applicant: Texas Instruments Incorporated, Dallas, TX (US)

(72) Inventors: Nandakishore Raimar, Bangalore (IN); Sayantan Gupta, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/495,966

(22) Filed: Apr. 24, 2017

(65) Prior Publication Data

US 2018/0309362 A1 Oct. 25, 2018

(51) Int. Cl.
*H02M 3/07* (2006.01)
*H02M 1/00* (2006.01)

(52) U.S. Cl.
CPC .............. *H02M 3/07* (2013.01); *H02M 3/073* (2013.01); *H02M 2001/0006* (2013.01); *H02M 2003/075* (2013.01)

(58) Field of Classification Search
CPC ........................................................ H02M 3/07
USPC ....... 327/530, 534, 535, 536, 537, 538, 540, 327/541, 543
See application file for complete search history.

(56) References Cited

U.S. PATENT DOCUMENTS

| | | | | |
|---|---|---|---|---|
| 5,680,300 A * | 10/1997 | Szepesi | ................... | H02M 3/07 363/59 |
| 6,208,196 B1 * | 3/2001 | St. Pierre | ................ | H02M 3/07 327/536 |
| 6,873,203 B1 * | 3/2005 | Latham, II | ............ | H02M 3/073 327/538 |
| 7,362,163 B1 * | 4/2008 | Raghavan | ............... | H02M 3/07 327/535 |
| 9,281,743 B1 * | 3/2016 | Oner | ...................... | H02M 3/073 |
| 9,866,111 B1 * | 1/2018 | Zhao | ....................... | H02M 3/07 |
| 2004/0222775 A1 | 11/2004 | Muramatsu | | |
| 2005/0007186 A1 * | 1/2005 | Kamijo | .................... | H02M 3/07 327/536 |
| 2007/0013434 A1 * | 1/2007 | Peschke | .................. | H02M 3/07 327/536 |
| 2008/0197898 A1 | 8/2008 | Lin | | |
| 2017/0013222 A1 * | 1/2017 | Choi | ....................... | H02M 3/07 |

OTHER PUBLICATIONS

PCT International Search Report dated Aug. 2, 2018.

* cited by examiner

*Primary Examiner* — William Hernandez
(74) *Attorney, Agent, or Firm* — Lawrence J. Bassuk; Charles A. Brill; Frank D. Cimino (57) ABSTRACT

A VBOOST generator includes, for example, a voltage regulator for generating a first power rail VX between the supply voltage VCC and ground. A clock generator is arranged to generate a clock signal oscillating between the supply voltage VCC and the voltage VCC−VX. A charge pump is arranged to couple the voltage VCC−VX to a first terminal of an on-substrate flyback capacitor during a first half-cycle of the first clock signal and is arranged to couple the voltage VCC to the first terminal of the flyback capacitor during a second half-cycle of the first clock signal. A pin is coupled to the substrate couples the voltage VCC+VX developed on a second terminal of the flyback capacitor during the second half-cycle of the first clock signal to an external bucket capacitor. A second charge pump is optionally included to increase the charging capacity of the VBOOST generator.

13 Claims, 5 Drawing Sheets

VBOOST SIGNAL GENERATION

BACKGROUND

Processors are increasingly used to control devices such as controllers for motor control. The processors and controllers are often formed on single or separate substrates using integrated circuit technology. The substrate(s) for the processors and controllers can be mounted in a single package, which has terminals ("pins") for conveying signals (and power) towards or away from the substrates mounted (e.g., encapsulated) in the package. Signals are often conveyed via the pins to circuitry not suited for inclusion in the package (e.g., because of size, power dissipation, cost in manufacture, process limitations). However, increasing the number of pins of a package, typically increases the cost and/or area of manufacturing components including the packages with increased pin counts.

SUMMARY

Reducing pin-counts can be addressed in a system and method for VBOOST signal generation. A described VBOOST generator includes, for example, a voltage regulator for generating a first power rail VX between the supply voltage VCC and ground. A clock generator is arranged to generate a clock signal oscillating between the supply voltage VCC and the voltage VCC–VX. A charge pump is arranged to couple the voltage VCC–VX to a first terminal of an on-substrate flyback capacitor during a first half-cycle of the first clock signal and is arranged to couple the voltage VCC to the first terminal of the flyback capacitor during a second half-cycle of the first clock signal. A pin is coupled to the substrate couples the voltage VCC+VX developed on a second terminal of the flyback capacitor during the second half-cycle of the first clock signal to an external bucket capacitor. A second charge pump is optionally included to increase the charging capacity of the VBOOST generator.

This Summary is submitted with the understanding that it is not be used to interpret or limit the scope or meaning of the claims. Further, the Summary is not intended to identify key features or essential features of the claimed subject matter, nor is it intended to be used as an aid in determining the scope of the claimed subject matter.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be example of that embodiment, and not intended to intimate that the scope of the disclosure, including the claims, is limited to that embodiment.

Certain terms are used throughout the following description—and claims—to refer to particular system components. As one skilled in the art will appreciate, various names may be used to refer to a component or system. Accordingly, distinctions are not necessarily made herein between components that differ in name but not function. Further, a system can be a sub-system of yet another system. In the following discussion and in the claims, the terms "including" and "comprising" are used in an open-ended fashion, and accordingly are to be interpreted to mean "including, but not limited to . . . ." Also, the terms "coupled to" or "couples with" (and the like) are intended to describe either an indirect or direct electrical connection. Thus, if a first device couples to a second device, that connection can be made through a direct electrical connection, or through an indirect electrical connection via other devices and connections. The term "portion" can mean an entire portion or a portion that is less than the entire portion. The term "pin" can mean a terminal for coupling signals and electrical power onto and off from a package including the pin.

Figure 1:
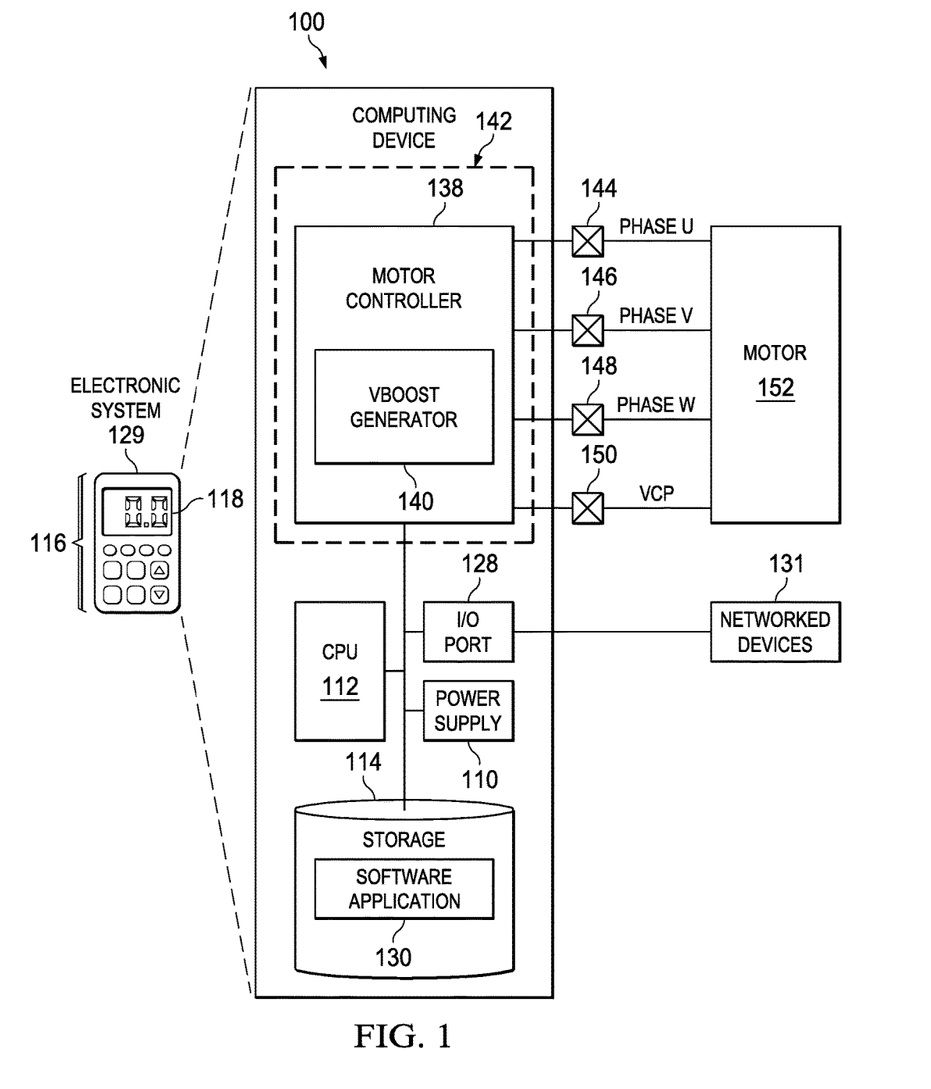
FIG. 1 is a schematic of a computing device 100 in accordance with example embodiments.

FIG. 1 is a schematic of a computing device 100 in accordance with example embodiments. For example, the computing device 100 is, or is incorporated into, an electronic system 129, such as a computer, electronics control "box" or module, robotics equipment (including fixed or mobile), automobiles, industrial motor controllers, or any other type of system where a computer uses differential signaling.

In some embodiments, the computing device 100 comprises a megacell or a system-on-chip (SoC) which includes control logic components such as a CPU 112 (Central Processing Unit), a storage 114 and a power supply 110. The CPU 112 includes functionality provided by discrete logic components and/or is arranged to execute application-specific instructions (e.g., software or firmware) that, when executed by the CPU 112, transform the CPU 112 into a special-purpose machine. The CPU 112 is arranged to receive decoded information detected by a receiver (RX) envelope detector, where the described envelope detector is arranged to receive differential transmissions encoded with information transmitted from a transmitter coupled to another CPU 112.

The CPU 112 comprises memory and logic that store information frequently accessed (e.g., written to and/or read from) from the storage 114. The computing device 100 is often controlled by a user using a UI (user interface) 116, which provides output to and receives input from the user during the execution the software application 130. The output is provided using the display 118, which includes annunciators (such as indicator lights, speakers, vibrators, and the like) and controllers. The input is received using audio and/or video inputs (using, for example, voice or image recognition), and electrical and/or mechanical devices (such as keypads, switches, proximity detectors, gyros, accelerometers, resolvers, and the like).

The CPU 112 is coupled to I/O (Input-Output) port 128, which provides an interface that is configured to receive input from (and/or provide output to) networked devices 131. The networked devices 131 can include any device (including "Bluetooth" units that are electronically paired with the computing device 100) capable of point-to-point and/or networked communications with the computing device 100. The computing device 100 is optionally coupled to peripherals and/or computing devices, including tangible (e.g., non-transitory) media (such as flash memory) and/or cabled or wireless media. These and other input and output devices are selectively coupled to the computing device 100 by external devices using wireless or cabled connections.

The storage 114 is accessible, for example, by the networked devices 131. The CPU 112, storage 114, and power supply 110 can be coupled to an external power supply (not shown) or coupled to a local power source (such as a battery, solar cell, alternator, inductive field, fuel cell, capacitor, and the like).

The storage 114 (which can be memory such as on-processor cache, off-processor cache, RAM, flash memory, data registers, flip-flops, disk storage, and the like) stores one or more software applications 130 (e.g., embedded applications) that, when executed by the CPU 112, transform the computing device 100 into a special-purpose machine suitable for performing one or more targeted functions such as detection of information encoded in modulated signals (e.g., where the information and/or data is used to modulate a carrier frequency of a signal generated for transmission to the computing device 100).

The computing system 100 includes a motor controller 138 arranged to generate signals for driving (e.g., controlling) a motor 152. The motor controller 138 includes (or is coupled in electrical communication with) a VBOOST generator 140. The motor controller 138 and the VBOOST generator 140 are optionally formed on the same substrate 142. The VBOOST generator 140 is arranged, for example, to generate control signals having voltages substantially higher (for example, typically by a voltage VX level higher than VCC, where VX can be selected in accordance with a maximum gate-to-source voltage of the power MOS—metal on semiconductor—transistor for driving the motor 152) than a voltage supply for powering logic circuitry in the motor controller 138 and the VBOOST generator 140.

The VBOOST generator 140 is arranged to generate a VCP (charge pump output voltage) signal, which is a power source having a voltage that is boosted above the power rail VCC. The signal VCP is coupled to the motor through pin 150, where the power is returned from the motor 152 to the VBOOST generator to a respective phase pin U 144, V 146, or W 148, where the phase pin is coupled to the source of a high-side switching transistor such that current flows from the high-side switching transistor into the phase pin (see phase pin 392 discussed below with reference to FIG. 3).

As discussed below, an example VBOOST generator 140 includes a charge pump to boost internal voltages (e.g., on the substrate 142) of an internal (e.g., on the substrate 142) flyback capacitor in the charge pump. Forming the flyback capacitor in the substrate 142 reduces a pin-count of pins for coupling signals (including power) to devices external to the substrate 142 and reduces the pin-count and number of external components otherwise required or implemented). The VBOOST generator 140 is arranged to reduce the voltages otherwise developed across the flyback capacitor, which increases the suitability of inclusion of the flyback capacitor on the substrate (which reduces pin-counts) for various higher voltage applications. Although the VBOOST generator 140 is described in a context of controlling motors, the VBOOST generator 140 is adapted for generating boosted voltages for controlling other devices operating in response to control signals having voltages higher than, for example, control signals generated by circuitry having power rails VCC and ground for driving the gates of power MOS transistors.

In various systems, processors and controllers often are designed to operate at voltages and currents substantially less than voltages and currents used to control motors. Various pins of the package are used to convey signals (and power) to external components for generating control signals. External components are used because of the prohibitive cost of forming these components on substrates manufactured using integrated circuit manufacturing technologies.

Figure 2:
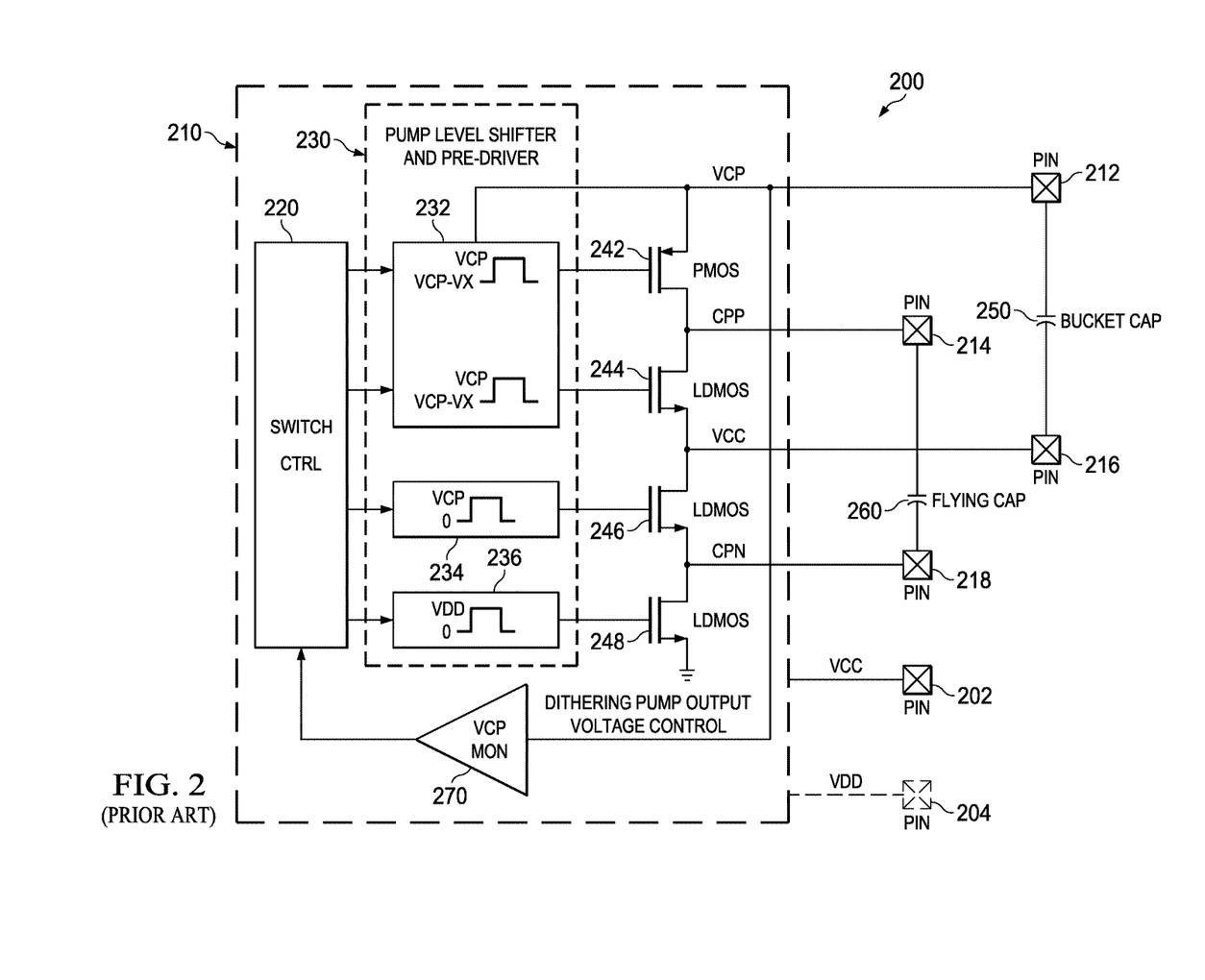
FIG. 2 is a schematic diagram of an off-chip flyback capacitor-based motor controller.

FIG. 2 is a schematic diagram of an off-chip flyback capacitor-based charge pump of a motor controller 200. The motor controller 200 includes a package 210, which includes pins and 212, 214, 216, and 218. The cathode of the bucket capacitor 250 (which is external to package 210) is coupled to the pin 212 and the anode of about the capacitor 250 is coupled to the pin 216. The cathode of the flyback capacitor 260 (which is external to package 210) is coupled to the pin 214 and the anode of the flyback capacitor 260 is coupled to the pin 218.

The package 210 includes (internally) a switch controller 220 (SWITCH CTL), a charge pump-level shifter and driver 230, drive transistors 242, 244, 246, and 248, and a dithering pump output voltage controller (VCP MON) 270 for monitoring and controlling the charge pump output voltage (VCP).

The switch controller 220 controls the timing of the drive transistors 242, 244, 246, and 248. However, the switch controller 220 is typically implemented using standard CMOS (complementary metal on semiconductor) technologies, which produce outputs that are not directly suited for driving the drive transistors 242, 244, 246, and 248 (e.g., which are in turn arranged to switch voltages generally higher than the voltages that can be switched using standard CMOS technologies). The charge pump-level shifter and pre-driver 230 is arranged to receive transistor drive control signals from the switch controller 220 and to generate respective drive signals for a respective drive transistor of the drive transistors 242, 244, 246, 248.

For example, the switching block 232 of the charge pump-level shifter and pre-driver 230 is arranged to generate a first pulse for generating the drive signal for the PMOS (P-type metal oxide semiconductor) transistor 242. The first pulse has a high voltage level of VCP (which is the output voltage developed by the motor controller 200 at node VCP and couples high switching currents from the bucket capacitor 250) and a low voltage level of VCP–VX (where VX can be the gate-to-source voltage of the transistor being driven and is typically 5 volts for driving LDMOS). The switching block 232 is arranged to generate a second pulse for generating the drive signal for the LDMOS (laterally diffused metal oxide semiconductor) transistor 244. The second pulse also has a high voltage level of VCP and a low voltage level of VCP–VX. The switching block 234 is arranged to generate a third pulse for generating a drive signal for the LDMOS transistor 246. The third pulse as a high voltage level of VCP and a low voltage level of ground (0 volts). The switching block 236 is arranged to generate a fourth pulse for generating a drive signal for the LDMOS transistor 248. The fourth pulse as a high voltage level of VDD (which is the "low" voltage supply of the CMOS switch controller 220 and is typically 5 volts) and a low voltage level of ground (0 volts).

The drive transistors 242, 244, 246, and 248 are arranged as a charge pump for generating output voltages higher than the supply voltages. The source of the PMOS drive transistor 242 is the VCP node VCP, which is coupled to the pin 212 and to the cathode of the bucket capacitor 250. The drain of the PMOS drive transistor 242 (and the drain of the LDMOS drive transistor 244) is the node CPP, which is coupled to the pin 214 and to the cathode of the flyback capacitor 260. The source of the LDMOS drive transistor 244 (and the drain of the LDMOS drive transistor 246) is the node VCC (which couples a "high" voltage supply ranging from 4.5 through 19 volts), which is coupled to the pin 216 and to the anode of the bucket capacitor 250. The source of the LDMOS drive transistor 246 (and the drain of the LDMOS drive transistor 248) is the node CPN (which couples the bottom plate potential of external flyback capacitor 250), which is coupled to the pin 218 and to the anode of the flyback capacitor 250.

In operation, the motor controller 200 is arrange to store charge on the flyback capacitor 260 and to transfer the stored charge to the bucket capacitor. For example, the switch controller 220 is arranged to activate the drive transistors 248 and 244 (with the other drive transistors off) such that the voltage VCC supplies charge for storing on the flyback capacitor 260 as a voltage substantially equal to VCC. The drive transistors 248 and 244 are switched off and the drive transistors 242 and 246 are activated such that the charge stored on the flyback capacitor 260 is transferred via node CPP (which couples the top plate potential of external flyback capacitor 250) and drive transistor 242 to the cathode the bucket capacitor 250 to charge the capacitor at a voltage substantially equal to VCC. Because the anode of the bucket capacitor is coupled to the VCC supply, the voltage at the cathode (node VCP) of the bucket capacitor 250 with respect to ground is twice the voltage of the VCC. The dithering pump output voltage controller (VCP MON) 270 for monitors the charge pump output voltage (VCP) and adjust the width and the timing of the first, second, third, and fourth pulses to maintain the voltage developed at the node VCP at a controlled level. Accordingly, a voltage greater than VCC is developed by the charge pump.

When the node VCP is coupled to a load (such as a control pin of a motor), the voltage of the node VCP drops because of the loss of stored charge in the bucket capacitor 250. The dithering pump output voltage controller (VCP MON) 270 detects the drop in the VCP node voltage and pulses the drive transistors to pump more charge into the flyback capacitor 260, which is then pumped into the bucket capacitor 260.

When the load currents and voltages are relatively high (e.g., greater than 8 volts when using a VCC of five volts), the drive transistors 242, 244, 246, and 248 are pulsed more frequently, which causes more heat dissipation, and can lead to over-temperature conditions such as over-heating and activation of thermal shutoff safety mechanisms. Further, increased frequencies of pulsing of the drive transistors 242, 244, 246, and 248 as well as the high voltage swing encountered at pins 218 and 214 can also lead to substantial increases in electromagnetic radiation, which potentially causes electromagnetic interference (EMI). Conversely, at lower voltages (and lower currents), less charge can be stored in the bucket capacitor 260, which in turn leads to lowered drive strength for driving loads.

In addition to the pin 212 for supplying the voltage VCP, three other pins (pins 214, 216, and 218) are used to couple current from the external flyback capacitor 260 and the bucket capacitor 250. The external flyback capacitor 260 and the bucket capacitor 250 are integrated off-chip because the relative inefficiencies (increased cost and area) of forming capacitors on an integrated circuit substrate because of operating conditions, which can require tolerance to relatively high voltages. As discussed above, the additional pins causes larger and more expensive packages to be used, which increases the cost of any system including the motor controller 200.

Figure 3:
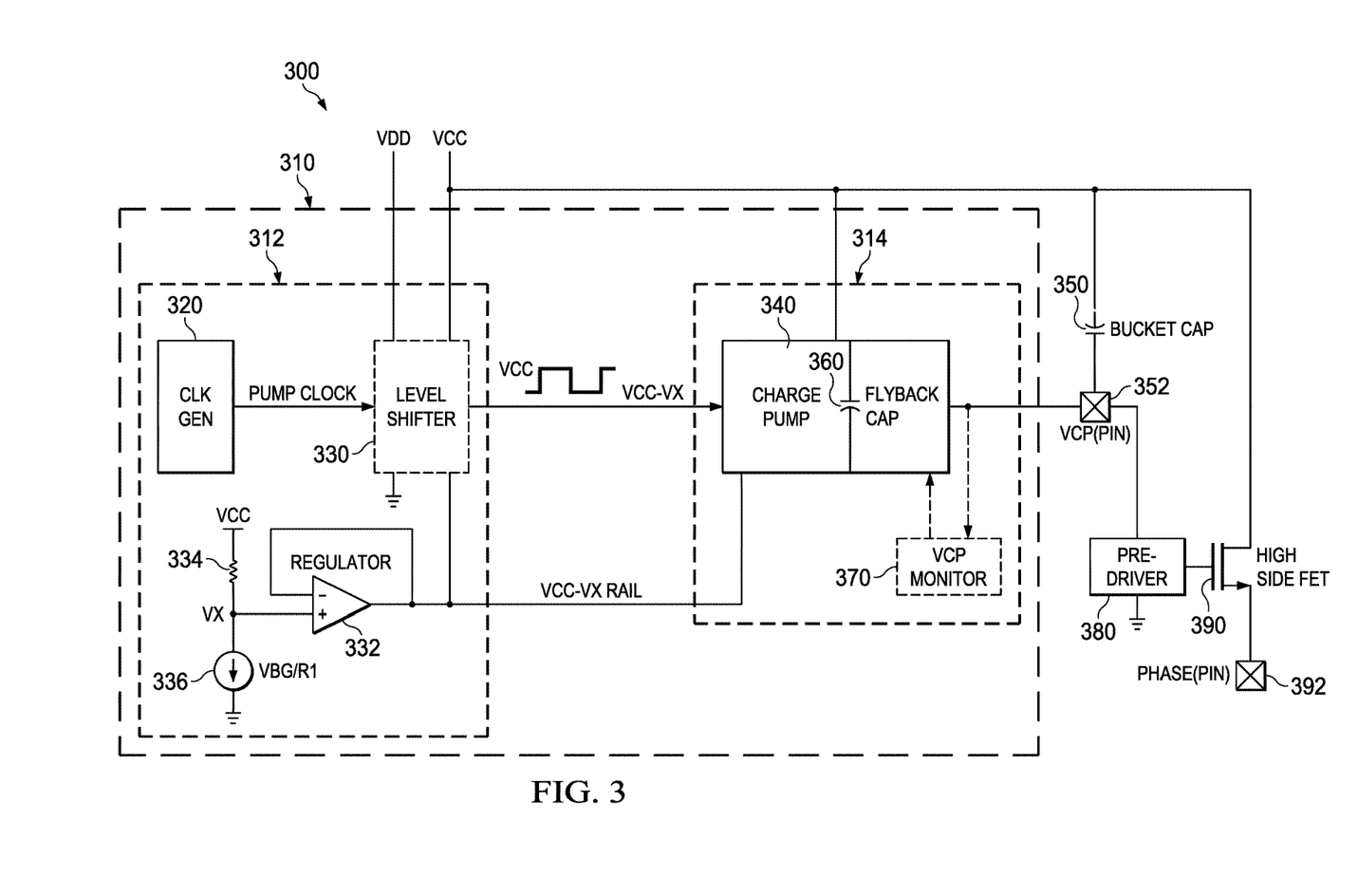
FIG. 3 is a schematic diagram of an on-chip flyback capacitor-based VBOOST signal generator in accordance with example embodiments.

FIG. 3 is a schematic diagram of an on-chip flyback capacitor-based VBOOST signal generator 300 in accordance with example embodiments. The VBOOST signal generator 300 includes a substrate 310, a clock generator (CLK GEN) 320, a level shifter 330, a regulator 332, a charge pump 340, a flyback capacitor 360, an optional VCP monitor 370, a pre-driver 380, and a high-side switching transistor (HIGH-SIDE FET) 390.

The clock generator 320 is arranged to generate an output a pump clock signal, which oscillates between 0 volts (ground) and VDD (which is the "low" voltage supply of the CMOS the level shifter 330 and is typically 5 volts). The optional level shifter 330 is arranged to level shift (e.g., raise) the pump clock signal to generate a raised-voltage pump signal for driving the charge pump 340. The pump clock signal is raised in voltage such that the raised-voltage pump signal oscillates between a floating rail (e.g., virtual ground) and VCC (which is a "high" voltage supply ranging from 4.5 through 19 volts or even higher voltages based on a particular application). When the optional level shifter 330 is not included, the clock generator 320 is arranged to generate raised-voltage pump clock signal directly, where the raised-voltage pump clock signal oscillates between VCC and the difference between VCC and VX (e.g., VCC−VX).

The raised-voltage pump signal is generated by a regulator 332. The regulator 332 includes a non-inverting terminal, which is coupled to the center node of a voltage divider formed by components 334 and 336. The first terminal of component 334 is coupled to VCC and a second terminal of components 334 is coupled to a first terminal of component 336 (which forms the center node of a voltage divider), while a second terminal of component 336 is coupled to ground. The voltage divider is arranged to generate a reference voltage that is less than the voltage of VCC in accordance with the ratio of the voltage drop between components 334 and 336. For example, component 334 can be a first resistor or a zener diode, and the component 336 can be a second resistor or a voltage bias generator (VBG) to sink a defined current. The voltage at node VX provides a stable reference voltage with respect to VCC over a wide range of temperatures.

The output (e.g., which is the floating rail) of the regulator 332 is coupled to an inverting input of the regulator 332. Coupling the outputs of the regulator 332 to the inverting input of the regulator 332 forms a feedback loop. The feedback loop of the regulator 332 helps ensure, for example, the floating rail (VCC−VX RAIL, where VX is a typical LDMOS (e.g., using in power MOS technology) drive voltage such as 5 volts generated by regulator 332 remains at a constant voltage level (e.g., irrespective of varying loads on the floating rail). The voltage VX can be selected in accordance with the voltage selected for suitably driving the gate of an output LDMOS transistor (e.g., such that the gate-to-source voltage is not exceeded for reliable diode operation). For example, when the maximum gate-to-source voltage is 5 volts, the signal VBOOST is equal to VCC+5V.

The floating rail output is coupled to the floating ground input of the charge pump 340. Accordingly, a first voltage domain 312 and a second voltage domain 314 are established. The first voltage domain 312 is established where ground terminals of the clock generator 320, the level shifter 330, and the regulator (and associated voltage divider) 332.

The second voltage domain 340 is established where ground terminals of the charge pump 340 are virtual grounds (e.g., not coupled to an actual ground, such as the ground of the first voltage domain 312) coupled to the floating rail input (e.g., which is arranged to sink current sourced from the charge pump 340. The first voltage domain 312 is, for example, a first stage of the VBOOST signal generator 300, whereas the second voltage domain 314 is, for example, a second stage of the VBOOST signal generator 300.

The VBOOST signal generator 300 includes a voltage regulator for generating a VCC–VX rail from VCC such that the VCC–VX rail can be used as a ground rail for the charge pump to enable low voltage operation between VCC and the voltage difference VCC–VX ("low headroom"). The low headroom permits low voltage higher density capacitance in the charge pump design, which in turn reducing the area occupied on the substrate by the flyback capacitor of the charge pump. The charge pump clock is level-shifted to swing (e.g., oscillate) between VCC and the VCC–VX rail. For example, when VX is 6 Volts, the charge pump can generate a boosted output voltage (VBOOST) of VCC+6 Volts. To switch voltages higher than VCC, the LDMOS output transistors are driven by voltages higher than VCC (e.g., VCC+VX, see FIG. 4 and FIG. 5), which accommodates lower gate-to-source voltages (which depend on the manufacturing process) and lowers the resistance drain-to-source (RDSon). Accordingly, the charge pump operates using high and low input voltages of VCC and VCC–VX respectively, which are alternately coupled to the bottom plate of the integrated (e.g., on-substrate) low voltage flyback capacitor. The charge pump can be configured as doubler (to generate VCC+VX for driving light loads) or a tripler (to generate VCC+VX for driving heavy loads) in accordance with the expected application loads and a minimum VCC to be supplied.

The substrate 310 includes pins such as the pin 352 (VCP) and the pin 392 (PHASE). The cathode of the bucket capacitor 350 (e.g., a 1 µF capacitor, which is optionally external to the package enclosing a substrate 310) is coupled to the pin 352 and the anode of the capacitor 350 is coupled to VCC (which is a "high" voltage supply ranging from 4.5 through 19 volts). In contrast to the motor controller 200 as discussed in FIG. 2, the flyback capacitor (e.g., flyback capacitor 360) is formed on the substrate 310 to a VBOOST signal generator 300. Forming the flyback capacitor 360 on the substrate 310 reduces the pin-count of the package including the substrate 310, which otherwise would be used for coupling the flyback capacitor.

The operation of charge pump 340 is discussed below at least with reference to FIG. 4. In an embodiment, the charge pump 340 is self-regulating, which obviates the need for the optional VCP monitor 370. The VCP monitor 370 can be used in a tripler configuration (discussed below with reference to FIG. 5) for controlling the charge pump 340.

The VCP pin 352 is coupled to an input of the pre-driver 380. The pre-driver 380 generates a pre-driver control signal in response to the VCP. The pre-driver control signals coupled to the gate of the high-side switching transistor 390. The source of the high-side switching transistor 390 is coupled to VCC and the drain is coupled to the phase pin 392. The pre-driver 380 is arranged to level shift a pulse width modulation (PWM) control signal from a low voltage domain to a high(er) voltage domain (e.g., VCP), which is used to drive the (e.g., high-side switching transistor 390) LDMOS output transistor. The drain of the high-side switching transistor 390 is coupled to VCC and the source is coupled to the phase pin 392. The phase pin 392, for example, is for coupling to a phase (e.g., U, V, or W) of a three phase BLDC (brushless DC) motor, where the phase pin is coupled to the source of the high-side switching transistor such that current flows from the high-side switching transistor into the phase pin. Accordingly, the high-side switching transistor 390 carries high switching currents when charging the bucket capacitor 350.

Figure 4:
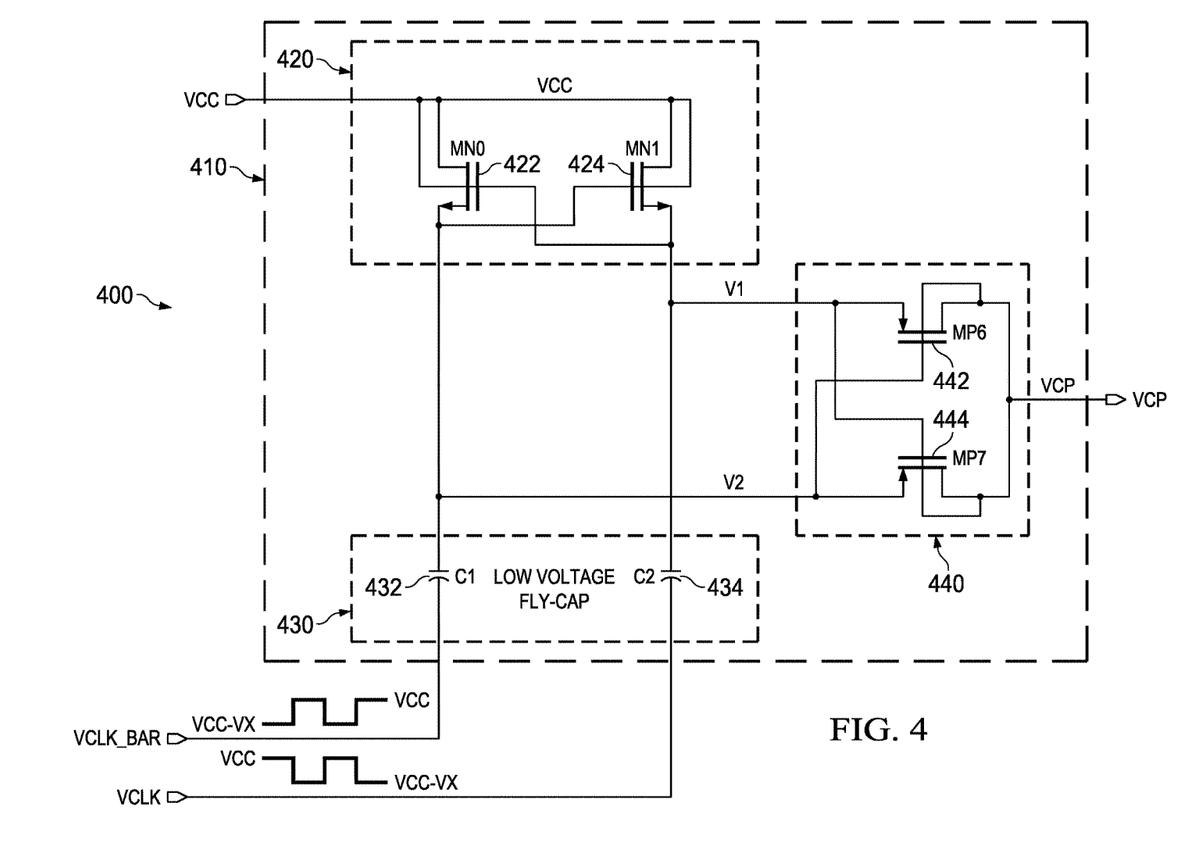
FIG. 4 is a schematic diagram of a charge pump doubler in accordance with example embodiments.

FIG. 4 is a schematic diagram of a charge pump doubler 400 in accordance with example embodiments. The charge pump doubler 400 includes a substrate portion 410, a first input pair of transistors 420, a first pair of flyback capacitors 430, and the first pair of output transistors 440.

The charge pump doubler 400 is generally arranged as a "doubler" architecture where the output power signal VCP (charge pump output) achieves an output voltage of VCC+VX (which is greater than the input voltage VCC). The charge pump doubler 400 is a charge pump for operating (e.g., while continuously outputting power) in an open loop (e.g., unmonitored). The charge pump double 400 architecture does not necessarily require a monitoring circuit in a loop for controlling the charge pump output because as the charge pump output can be designed to not exceed reliability voltage limits (e.g., even when continuously providing a VBOOST voltage of VX above VCC).

In general, the semiconductor devices formed in substrate portion 410 are formed in a substrate portion 410 in conjunction with a virtual ground coupled to a floating rail (such as a floating rail supplied by regulator 332). Accordingly, devices coupled to VCC—as well as devices generating voltages higher than VCC such as VCP—have a reduced voltage headroom VX (as compared with the voltage headroom encountered when such devices otherwise coupled to an absolute ground). The reduced voltage headroom VX, for example, allows for area-efficient solutions, including a relatively high-density low-voltage flyback capacitor (e.g., low-voltage flyback capacitor 430) formed within the substrate (e.g., and not externally coupled, which would otherwise require additional pins). The reduced voltage headroom VX (which is a fixed voltage across the charge pump 400) and the constant charge sourcing capacity (as discussed below) reduce EMI radiation otherwise generated and radiated. For example, the reduced voltage swings at the circuit nodes reduce noise injection to the substrate and power supply rails.

The first input pair of transistors 420 includes a cross-coupled pair of NMOS transistors 422 and 424. The drains of each of the NMOS transistors 422 and 424 are coupled to VCC. The gate of the first NMOS (MN0) transistor 422 (of the first input pair of transistors 420) is coupled to the source of the second NMOS (MN1) transistor 424 (of the first input pair of transistors 420) which forms node V1. The gate of the second NMOS transistor 424 is coupled to the source of the first NMOS transistor 422, which forms node V2.

The first pair of flyback capacitors 430 includes a pair of low voltage, high-density capacitors such as a first capacitor (C1) 432 and a second capacitor (C2) 434. The cathode of the first capacitor 432 (of the first pair of flyback capacitors 430) is coupled to the node V2, whereas the cathode of the second capacitor 434 (of the first pair of flyback capacitors 430) is coupled to the node V1. The anode of the first capacitor 432 is coupled to the inverted input clock signal VCLK_BAR, whereas the anode of the second capacitor 434 is coupled to the input clock signal VCLK, where the inverted input clock signal VCLK_BAR is the inversion of the input clock signal VCLK and has a duty cycle of 50 percent.

The first pair of output transistors 440 includes a cross-coupled pair of PMOS transistors 442 and 444. The source of the first output PMOS transistor (MP6) 442 is coupled to node V1, whereas the source of the second output PMOS transistor (MP7) 444 is coupled to node V2. The gate of the first PMOS transistor 442 (of the first output pair of transistors 424) is coupled to node V2 as well as the source of the second PMOS transistor 444 (of the first output pair of transistors 440). The gate of the second PMOS transistor 444 is coupled to node V1 as well as the source of the first output PMOS transistor 424.

As described following, the drains of the first PMOS transistor 442 and of the second PMOS transistor 444 are mutually coupled such that the VCP output power signal is formed in response to a first half-cycle of charge switched via the first output PMOS transistor 442 and a second half-cycle (e.g., 180 degrees out of phase with the first half-cycle) of charge switched via the second output PMOS transistor 444. Accordingly, a "constant" (e.g., always on) source of charge is coupled via the VCP output power signal. The VCP output power signal is typically integrated by an external bucket capacitor (such as bucket capacitor 350), which reduces output voltage swings and stores charge.

Each of the input clock signals is arranged to oscillate between the (higher) voltage level VCC and the (lower) voltage level VCC−VX. Accordingly, the inverted input clock signal VCLK_BAR is individually AC-coupled (e.g., coupled using alternating current with no direct current flow) to the source of the first NMOS transistor 422, while the input clock signal VCLK is individually AC-coupled to the source of the second NMOS transistor 424.

In response to a first transition in the input clock signals, a rise in the inverting input clock signal VCLK_BAR causes a rise of the voltage of the cathode of the first capacitor 432 (node V2), while a concomitant fall in the input clock signal VCLK causes a fall in the voltage of the cathode of the second capacitor 434 (node V1). The rise of the voltage of the cathode of the first capacitor 432 (node V2) asserts an active-high control signal activating the gate of the second NMOS transistor 424. The activation of the gate of the second NMOS transistor 424 and the fall of the voltage of the cathode of the second capacitor 434 (node V1) causes transference of charge from VCC to node V1. The fall in the voltage of node V1 asserts an active-low control signal activating the gate of the second PMOS transistor 444 such that, for example, charge motivated by the rise of the voltage of node V2 is coupled through the second PMOS transistor 444 to the power output signal VCP while the second PMOS transistor 444 is active (e.g., during a first half-cycle).

In response to a second transition (opposite in direction to the direction of the first transition) in the input clock signals, a rise in the input clock signal VCLK causes a rise of the voltage of the cathode of the second capacitor 434 (node V1), while a concomitant fall in the input clock signal VCLK_BAR causes a fall in the voltage of the cathode of the first capacitor 432 (node V2). The rise of the voltage of the cathode of the second capacitor 434 (node V1) asserts an active-control signal activating the gate of the first NMOS transistor 422. The activation of the gate of the first NMOS transistor 422 and the fall of the voltage of the cathode of the first capacitor 432 (node V2) causes transference of charge from VCC to node V2. The fall in the voltage of node V2 asserts an active-low control signal activating the gate of the first PMOS transistor 442 such that, for example, charge motivated by the rise of the voltage of node V1 is coupled through the first PMOS transistor 442 to the power output signal VCP while the first PMOS transistor 442 is active (e.g., active during a second half-cycle, where the first half-cycle and the second half-cycle complete a full cycle of the clock input signals).

Accordingly, a first capacitor is charged during a first-half cycle of a clock by coupling a voltage VX to the top plate of the first capacitor and coupling the voltage VCC−VX to the bottom plate of the first capacitor. During a second-half cycle of a clock, the bottom plate voltage is decoupled from the voltage VCC−VX and coupled to VCC to raise (e.g., by charge pumping action) the top plate voltage of the first capacitor to the voltage VCC+VX.

In a similar manner, a second capacitor is charged during a second-half cycle of a clock by coupling a voltage VX to the top plate of the second capacitor and by coupling the voltage VCC−VX to the bottom plate of the second capacitor. During a (e.g., subsequent) first-half cycle of the clock, the bottom plate voltage is decoupled from the voltage VCC−VX and coupled to VCC to raise (e.g., by charge pumping action) the top plate voltage of the second capacitor to the voltage VCC+VX. The voltage VCC+VX generated by the first capacitor is selectively coupled to charge the external bucket capacitor during the second half-cycle, while the voltage VCC+VX generated by the second capacitor is selectively coupled to charge the external bucket capacitor during the first half-cycle.

Figure 5:
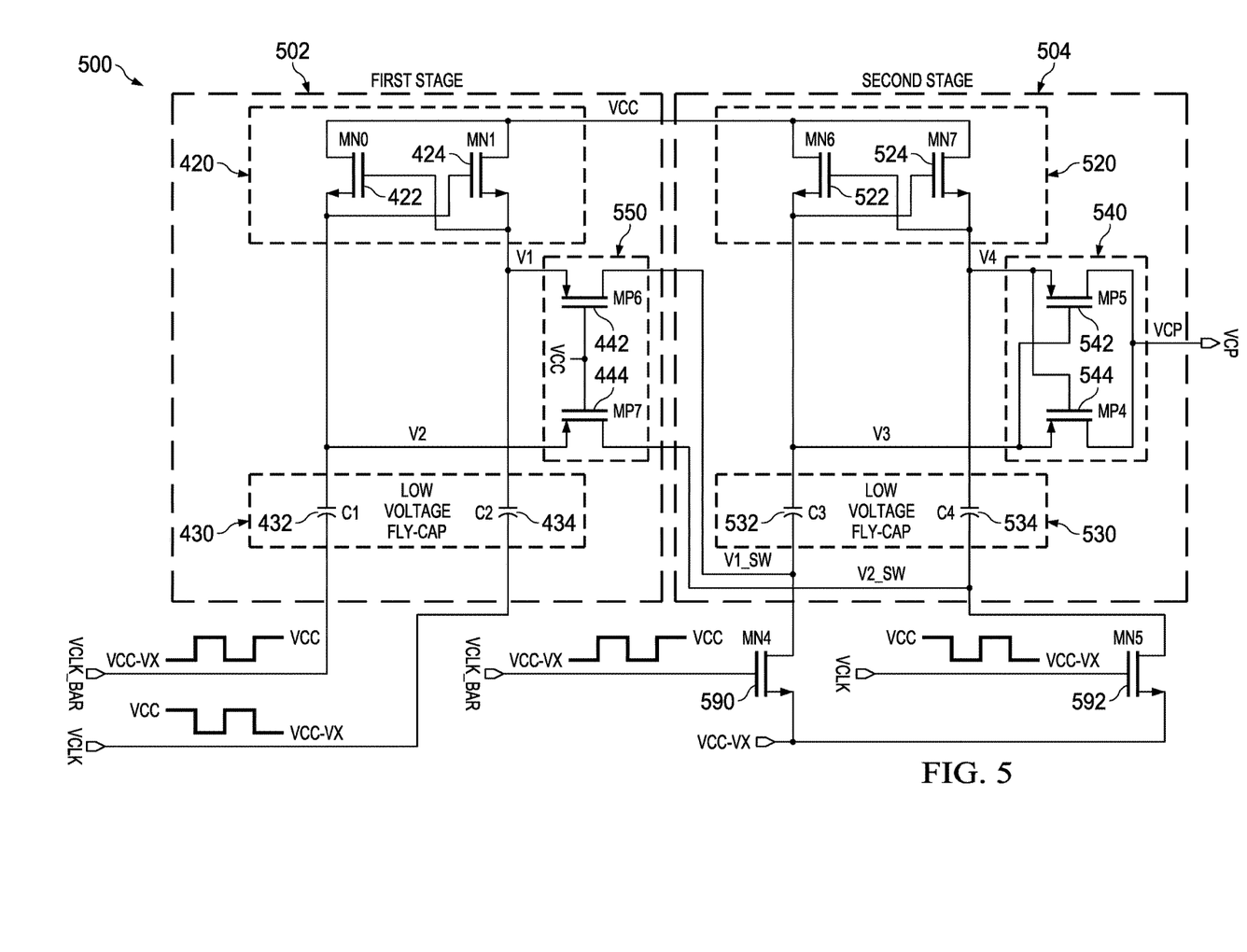
FIG. 5 is a schematic diagram of a charge pump tripler in accordance with example embodiments.

FIG. 5 is a schematic diagram of a charge pump tripler 500 in accordance with example embodiments. In an embodiment, the charge pump tripler 500 is arranged to generate boost voltages (for example, at VCC power supplies lower than five volts) for applications where heavy loading is present or might be expected. The second stage is coupled to a monitoring circuit such as VCP monitor 370 where the voltage monitor monitors the output voltage VCP to detect when the output voltage VCP exceeds the voltage of VCC+VX and halts (or gates clock signals to a fixed state) the charge pump clock. For example, the output voltage VCP can be coupled to an external bucket capacitor, which develops an integrated output voltage VCP, which in turn is regulated by the voltage monitor.

Accordingly, the second stage is a closed-loop system for regulating the output voltage VCP to voltage "dithered" (e.g., regulated) around the voltage VCC+VX. The combined output of first stage charge pump 502 added a two to the second stage charge pump 504 increases the amount of charge stored or contributing to the drive capacity (e.g., amount of current can be supplied) of the charge pump tripler 500.

The charge pump doubler 500 includes a first stage charge pump 502 having outputs coupled to a second stage charge pump 504 (which can be included on the same substrate upon which the first stage charge pump 502 is formed). The first stage charge pump 502 is similar to the charge pump doubler 400 with an exception that the outputs of the first pair of output transistors 550 are not mutually coupled. Instead (for example), charge is pumped from each output transistor (e.g., 442 and 444) to the anodes of capacitors C3 and C4 respectively (e.g., 532 and 534), which increases the amount of charge that can be pumped to an (e.g., external) bucket capacitor. Charge is pumped through transistor 442 when VLCK transitions to VCC (e.g., when V1 exceeds VCC such that the voltage transistor 442 gate-to-source voltage exceeds the voltage threshold) during the first half-cycle and charge is pumped through transistor 444 when VLCK_BAR transitions to VCC (e.g., when V2 exceeds VCC such that the voltage transistor 442 gate-to-source voltage exceeds the voltage threshold) during the second half-cycle.

The second input pair of transistors 520 includes a cross-coupled pair of NMOS transistors 522 and 524 (as compared with the first input pair of NMOS transistors 420). The drains of each of the NMOS transistors 522 and 524 are coupled to VCC. The gate of the first NMOS (MN6) transistor 522 is coupled to the source of the second NMOS (MN7) transistor 524, which forms node V4. The gate of the second NMOS transistor 524 is coupled to the source of the first NMOS transistor 522, which forms node V3.

The second pair of flyback capacitors 530 includes a pair of low voltage, high-density capacitors such as a first capacitor (C1) 532 and a second capacitor (C2) 534. The cathode of the first capacitor 532 (of the second pair of flyback capacitors 530) is coupled to the node V3, whereas the cathode of the second capacitor 534 is coupled to the node V4.

The anode of the first capacitor 532 is coupled to the node V1_SW, which is the drain of the first output transistor 442 (of the first stage 502) and to the drain of a first clock buffer transistor (MN4) 590. The first clock buffer transistor 590 is arranged to selectively couple node the node V1_SW to the voltage (e.g., power rail) VCC−VX in response to the active level of the input clock signal VCLK_BAR.

The anode of the second capacitor 534 is coupled to the node V2_SW, which is the drain of the second output transistor 444 (of the first stage 502) and to the drain of a second clock buffer transistor (MN6) 592, which is arranged to selectively couple node V4 to the signal CRUMP_LDO_OUT in response to the active level of the input clock signal VCLK.

For example, during the first half-cycle, VCLK_BAR is low and current is pumped through transistor 442 to node V1_SW (due to the anode of capacitor 434 being switched high per VCLK). The rise in voltage of node V1_SW raises the voltage at the anode of capacitor 532 (while the first clock buffer transistor is 590 is turned off per VCLK_BAR). The rise in voltage of the anode is transferred to the cathode to raise the voltage of node V3. The rise in the voltage of node V3 turns the output transistor 542 off (while a concomitant drop in the voltage of node V4 turns transistor 544 on). The rise in voltage of node V3 also activates the transistor 524 to charge the cathode of capacitor 534 (while the anode of capacitor 534 is coupled to VCC−VX via transistor 592).

During the second half-cycle, VCLK is low and current is pumped through transistor 444 to node V2_SW (due to the anode of capacitor 432 being switched high per VCLK_BAR). The rise in voltage of node V2_SW raises the voltage at the anode of capacitor 534 (while the second clock buffer transistor is 592 is turned off per VCLK). The rise in voltage of the anode is transferred to the cathode to raise the voltage of node V4. The rise in the voltage of node V4 turns the output transistor 544 off (while a concomitant drop in the voltage of node V3 turns transistor 542 on). The rise in voltage of node V4 also activates the transistor 522 to charge the cathode of capacitor 532 (while the anode of capacitor 532 is coupled to VCC−VX via transistor 592).

Accordingly, the first stage 502 generates a first stage output voltage higher than VCC during both the first and second half cycles, and the second stage 504 generates a second stage output voltage higher than the first stage output voltage during both the first and second half cycles such that the second stage output voltage (VCP) is both boosted in voltage and drive capacity. The second stage VCP optionally includes a voltage monitor (such as VCP monitor 270) to regulate the VCP output.

The various embodiments described above are provided by way of illustration only and should not be construed to limit the claims attached hereto. Those skilled in the art will readily recognize various modifications and changes that could be made without following the example embodiments and applications illustrated and described herein, and without departing from the true spirit and scope of the following claims.

What is claimed is:

1. An integrated circuit, comprising:
   a first power rail for carrying a common carrier voltage (VCC), a circuit ground, and a charge pump voltage output pin;
   a voltage regulator having terminals coupled between the first power rail and the circuit ground, the voltage regulator having a second power rail to generate a second power rail voltage (VCC-VX) which is a voltage less than the voltage on the first power rail and is a voltage greater than ground in response to a reference voltage VX and the voltage on the first power rail;
   a clock generator circuit having a first clock output providing a first clock signal, the first clock signal being coupled to the first power rail during a first half-cycle and being coupled to the second power rail during a second half-cycle;
   a first flyback capacitor having a first terminal and a second terminal, the first terminal being coupled to the first clock output; and
   a first charge pump circuit having inputs coupled to the first power rail, to the second terminal of the first flyback capacitor and to the charge pump voltage output pin, the first charge pump circuit coupling a charge pump voltage greater than the voltage on the first power rail from the second terminal of the first flyback capacitor to the charge pump voltage output pin during the second half-cycle of the first clock signal.

2. The integrated circuit of claim 1 in which the clock generator circuit has a second clock output providing a second clock signal, the second clock signal being coupled to the first power rail during a second half-cycle of the second clock cycle and being coupled to the second power rail during a first half-cycle of the second clock cycle;
   a second flyback capacitor having a first terminal and a second terminal, the first terminal being coupled to the second clock output; and
   the first charge pump circuit coupling the charge pump voltage from the second terminal of the second flyback capacitor to the charge pump voltage output pin during the first half-cycle of the second clock signal.

3. The integrated circuit of claim 2 including:
   a pair of input transistors coupled between the first power rail and the second terminals of the first and second flyback capacitors; and
   a pair of output transistors coupled between the second terminals of the first and second flyback capacitors and the charge pump voltage output pin.

4. The integrated circuit of claim 3 in which the input transistors have drains and the drains of the input transistors are coupled together and to the first power rail.

5. The integrated circuit of claim 3 in which the output transistors have drains and the drains of the output transistors are coupled together and to the charge pump voltage output pin.

6. The integrated circuit of claim 1 in which the charge pump voltage output pin is adapted to be coupled to a bucket capacitor.

7. A method of operating a charge pump, comprising:
receiving power from a first power rail providing a first power rail voltage Vcc;
generating a second power rail voltage Vcc-VX on a second power rail in response to a reference voltage VX and the first power rail voltage Vcc, the second power rail voltage Vcc-VX being less than the first power rail voltage;
coupling the first power rail voltage Vcc to a first terminal of a first flyback capacitor during a first half-cycle of a clock signal;
coupling the second power rail voltage Vcc-Vx to a first terminal of a second flyback capacitor during the first half-cycle of the clock signal;
coupling the first power rail voltage Vcc to the first terminal of the second flyback capacitor during a second half-cycle of the clock signal;
coupling the second power rail voltage Vcc-VX to the first terminal of the first flyback capacitor during the second half-cycle of the clock signal; and
coupling a boosted voltage VCP greater than the first power rail voltage Vcc on a second terminal of the first flyback capacitor and on a second terminal of the second flyback capacitor to a charge pump output.

8. A system, comprising:
(a) an integrated circuit including:
a first power rail for carrying a common carrier voltage (VCC), a circuit ground, and a charge pump voltage output pin;
a voltage regulator having terminals coupled between the first power rail and the circuit ground, the voltage regulator having a second power rail to generate a second power rail voltage (VCC-VX) which is a voltage less than the voltage on the first power rail and is a voltage greater than ground in response to a reference voltage VX and the voltage on the first power rail;
a clock generator circuit having a first clock output providing a first clock signal, the first clock signal being coupled to the first power rail during a first half-cycle of the first clock signal and being coupled to the second power rail during a second half-cycle of the first clock signal;
a first flyback capacitor having a first terminal and a second terminal, the first terminal being coupled to the first clock output; and
a first charge pump circuit having inputs coupled to the first power rail, to the second terminal of the first flyback capacitor and to the charge pump voltage output pin, the first charge pump circuit coupling a charge pump voltage greater than the voltage on the first power rail from the second terminal of the first flyback capacitor to the charge pump voltage output pin during the second half-cycle of the first clock signal; and
(b) a bucket capacitor coupled to the charge pump voltage output pin.

9. The system of claim 8 in which the clock generator circuit has a second clock output providing a second clock signal, the second clock signal being coupled to the first power rail during a second half-cycle of the second clock signal and being coupled to the second power rail during a first half-cycle of the second clock signal;
a second flyback capacitor having a first terminal and a second terminal, the first terminal being coupled to the second clock output; and
the first charge pump circuit coupling the charge pump voltage from the second terminal of the second flyback capacitor to the charge pump voltage output pin during the first half-cycle of the second clock signal.

10. The system of claim 8 including:
a second flyback capacitor having a first terminal and a second terminal, the first terminal being coupled to the second clock output;
a pair of input transistors coupled between the first power rail and the second terminals of the first and second flyback capacitors; and
a pair of output transistors coupled between the second terminals of the first and second flyback capacitors and the charge pump voltage output pin.

11. The system of claim 10 in which the input transistors have drains and the drains of the input transistors are coupled together and to the first power rail.

12. The system of claim 10 in which the output transistors have drains and the drains of the output transistors are coupled together and to the charge pump voltage output pin.

13. The system of claim 8 in which the charge pump voltage output pin is adapted to be coupled to a bucket capacitor.

* * * * *